United States Patent
Barresi et al.

(10) Patent No.: US 12,270,157 B2
(45) Date of Patent: Apr. 8, 2025

(54) FROG FOR SWITCHES AND CROSSINGS

(71) Applicant: VOSSLOH COGIFER, Rueil Malmaison (FR)

(72) Inventors: Francesco Barresi, Strasbourg (FR); Sylvain Schmitt, Schoenenbourg (FR)

(73) Assignee: VOSSLOH COGIFER, Rueilfr Malmaison (FR)

( * ) Notice: Subject to any disclaimer, the term of this patent is extended or adjusted under 35 U.S.C. 154(b) by 0 days.

(21) Appl. No.: 18/403,009

(22) Filed: Jan. 3, 2024

(65) Prior Publication Data
US 2024/0150971 A1    May 9, 2024

Related U.S. Application Data

(62) Division of application No. 16/632,168, filed on Jan. 17, 2020, now abandoned.

(51) Int. Cl.
*E01B 11/46*    (2006.01)
*B23K 35/30*    (2006.01)
(Continued)

(52) U.S. Cl.
CPC .......... *E01B 11/46* (2013.01); *B23K 35/3053* (2013.01); *B23K 35/3066* (2013.01); *B23K 35/3073* (2013.01); *B23K 35/308* (2013.01); *C21D 6/004* (2013.01); *C21D 6/005* (2013.01); *C21D 9/04* (2013.01); *C22C 38/58* (2013.01); *C21D 2211/001* (2013.01);
(Continued)

(58) Field of Classification Search
CPC ....... E01B 11/46; E01B 7/10; B23K 35/3053; B23K 35/3066; B23K 35/3073; B23K 35/308; C21D 6/004; C21D 6/005; C21D 9/04; C21D 2211/001; C21D 2211/002; C21D 2211/008; C22C 38/58
See application file for complete search history.

(56) References Cited

U.S. PATENT DOCUMENTS

2017/0044634 A1    2/2017    Ueda et al.

FOREIGN PATENT DOCUMENTS

CN    1208776    2/1999
CN    102747299    10/2012
(Continued)

OTHER PUBLICATIONS

International Search Report dated Oct. 17, 2018.
(Continued)

*Primary Examiner* — Adil A. Siddiqui
(74) *Attorney, Agent, or Firm* — IPSILON USA, LLP

(57) ABSTRACT

A method for assembling at least one rolling support and guide element with a complementary part by direct flash welding includes the step of a first step carried out by a first flashing phase intended to increase the temperature of the surfaces to be welded in a homogeneous manner, the duration of this first step being between 15 s and 40 s. A second step is carried out by a phase of preheating by Joule effect of the parts to be welded, the duration of this second step being between 45 s and 55 s with a heating current of between 55 kA and 70 kA. A third step is carried out by a second flashing phase to deoxidize the faces to be welded while avoiding their re-oxidation, the duration of this third step being between 12 s and 22 s and with a flashing current of between 16 kA and 19 kA. A step is included bringing the surfaces to be welded into contact.

11 Claims, 1 Drawing Sheet

(51) Int. Cl.
  *C21D 6/00*   (2006.01)
  *C21D 9/04*   (2006.01)
  *C22C 38/58*  (2006.01)
  *E01B 7/10*   (2006.01)
(52) U.S. Cl.
  CPC .. *C21D 2211/002* (2013.01); *C21D 2211/008* (2013.01); *E01B 7/10* (2013.01)

(56) References Cited

FOREIGN PATENT DOCUMENTS

| EP | 0 906 452 | 10/2001 |
| FR | 2 864 117 | 6/2005 |
| JP | H10280098 | 10/1998 |
| JP | 2002363697 | 12/2002 |
| WO | 2013/190206 | 12/2013 |

OTHER PUBLICATIONS

Australian Search Report dated Jul. 17, 2023.
Eurasian Search Report dated Jul. 14, 2021.
Steel Hardness Conversion Table.

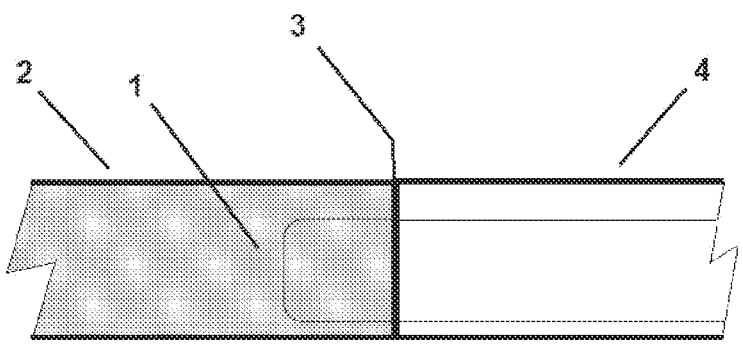
Figure 1
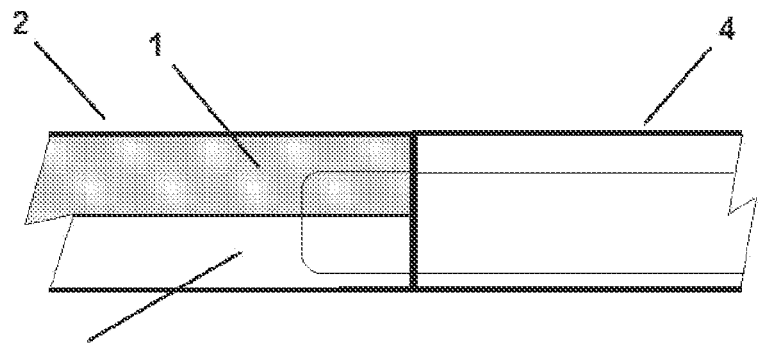
1bis    Figure 2

FROG FOR SWITCHES AND CROSSINGS

RELATED APPLICATION

This application is divisional application of U.S. patent application Ser. No. 16/632,168 filed on Jan. 17, 200 which is a National Phase of PCT/FR2018/051869 filed on Jul. 20, 2018, which in turn claims priority to French Patent Application No. 17 56903 filed no Jul. 20, 2017, the entirety of which are incorporated by reference.

FIELD OF THE INVENTION

The present invention relates to the field of rolling support and guide elements for a railroad vehicle and the welding of these elements together and more particularly to the field of switches or crossings and the welding of these to rails.

DESCRIPTION OF RELATED ART

In the railroad sector, the frogs and other components of the switch or crossing must withstand repeated passages of rolling vehicles. It is therefore essential that these elements reach sufficient hardness levels to withstand the repeated pressures exerted by moving railroad vehicles.

A common solution for ensuring a minimum level of hardness consists in using a cast steel with a composition of manganese, which gives it an austenitic structure. This manganese steel, also called Hadfield steel, has a hardness of 220 HB. After an explosion hardening operation, this steel can reach a hardness of 320 HB.

However, the implementation of this solution results in the production of track elements in which the repeated passages of vehicles lead to deformation of the traffic surfaces. This deformation requires on-site intervention, with reprofiling of the switch elements to avoid degradation and premature crack formation. In addition, casting defects may occur during the casting operation and lead to degradation of the track elements when a vehicle, even of low tonnage, travels in an area close to the casting defect.

Furthermore, if this steel meets the hardness conditions for switch elements, it has the drawback of not allowing the production of parts which can be welded directly to one another or to associated rails. Indeed, welding of a Hadfield-steel switch element to a rail requires the addition of a stainless steel spacer to overcome the slow cooling imposed by the steel of the rail. It therefore takes twice as long to weld such a join between a switch and a rail, owing to the essential presence of an intermediate insert.

To overcome the drawbacks associated with manganese steel, an alternative solution consists in the use of quenched rolled steel having a martensitic structure. This steel has the advantage of allowing the production of parts whose hardness is between 380 HB and 400 HB.

However, the martensitic structure of this steel changes above 250° C., which, during the preheating and welding operation, causes rapid deterioration of the original hardness of the steel. Thus, a welding operation on a switch element of this composition alters the quality of the steel and leads to premature wear of the part in use. In addition, this steel shows low ductility and toughness, which is at the origin of the rapid propagation of cracks.

OBJECTS AND SUMMARY

The object of the present invention is to overcome this drawback by proposing a rolling support and guide element for a railroad vehicle made of steel, whose composition makes it possible to meet the hardness constraints imposed by the function of this rolling support part, while permitting direct weldability, without an insert part, of the frog to a second element without excessive alteration of its hardness properties.

To that end, the invention relates to a rolling support and guide element for a railroad vehicle, characterized in that at least a portion positioned in the upper part of the element and forming the rolling surface is produced with a steel, the composition of which comprises, in addition to Fe:

$0.15 \leq C \leq 0.3\%$, $1 \leq Mn \leq 2\%$, $0.2\% \leq Ni \leq 1\%$, $0.5 \leq Cr \leq 2\%$, the steel having a mixed structure of tempered martensite and residual austenite and bainite after undergoing heat treatment with quenching and at controlled rate and duration.

The invention also relates to a method for assembling at least one element according to the invention with a complementary part by direct flash welding, comprising in particular:

a first step carried out by a first flashing phase intended to increase the temperature of the surfaces to be welded in a homogeneous manner, the duration of this first step being between 15 s and 40 s, a second step carried out by a phase of preheating by Joule effect of the parts to be welded, the duration of this second step being between 45 s and 55 s with a heating current of between 55 kA and 70 kA, a third step carried out by a second flashing phase to deoxidize the faces to be welded while avoiding their re-oxidation, the duration of this third step being between 12 s and 22 s and with a flashing current of between 16 kA and 19 kA and a speed of advance at the end of the flashing of between 2 mm/s and 3 mm/s, a step of bringing the surfaces to be welded into contact.

The invention also relates to a direct weld of at least one element according to the invention, made entirely with a steel of an above-mentioned composition, with at least one rail obtained by an assembly method according to the invention, characterized in that the breaking force F, expressed in kN, of the weld in flexion according to EN14587-3 is greater than the product of the modulus of inertia $W_{base}$ at the level of the base, expressed in cm³, multiplied by 4.261, according to the formula:

$$F \geq 4.261 \times W_{base}$$

BRIEF DESCRIPTION OF THE DRAWINGS

The invention will be better understood by virtue of the following description, which relates to at least one preferred embodiment, given by way of non-limiting example and explained with reference to the appended schematic drawings, in which:

FIG. 1 is a schematic representation of an exemplary construction of an element of the invention, produced from a single steel of the claimed composition, FIG. 2 is a schematic representation of an exemplary construction of an element of the invention, produced by superposition of two different types of steel.

DETAILED DESCRIPTION

It should be noted that, in the present document, the expression "rolling support and guide element for a railroad vehicle" relates to switches and rails and, more particularly, to the various components of these switches, which are in particular frogs, diamonds, throats, switch point rails, stock rails and half-sets of switches.

The invention relates to a rolling support and guide element 2 for a railroad vehicle, characterized in that at least a portion positioned in the upper part of the element 2 and forming the rolling surface is produced with a steel 1, the composition of which comprises, in addition to Fe:

0.15≤C≤0.3%,

1≤Mn≤2%, 0.2%≤Ni≤1%, 0.5≤Cr≤2%, the steel 1 having a mixed structure of tempered martensite and residual austenite and bainite after undergoing heat treatment with quenching and at controlled rate and duration.

According to a particular construction, the support and guide element 2 thus consists of a superposition of at least two different types of steel 1, 1b is in the form of a "sandwich", so that the upper portion of the element is formed from a steel 1 of the above-mentioned composition.

According to a preferred alternative particular construction, the element 2 of the invention is characterized in that the whole of the element 2 is made with a steel 1 of the above-mentioned composition.

For this second construction feature, the construction of an element 2 made entirely with a steel 1 of this composition and with such a structure makes it possible to take advantage of the properties of high mechanical strength of the steel 1 to withstand the stresses of wear and recurrent impacts experienced by the switch, while guaranteeing optimal weldability. This optimization of the weldability can in particular be characterized by various examinations set out in the standard EN14587-3, in particular specified in paragraphs § 10.4.9 and § 10.4.10.

It is thus possible to characterize the strength of the rolling support and guide element 2 of the invention thanks to certain properties of the steel 1, which are in particular:
- an elastic limit at 0.2% deformation (Rp 0.2%) which is greater than 1050 MPa,
- a breaking limit (Rm) which is greater than 1400 MPa,
- an elongation at break (A %) which is greater than 11%.

By virtue of the low carbon concentration compared to a manganese steel and to the heat treatment of the steel 1 of the element 2 of the invention, the weldability of the element is thereby optimized. A carbon concentration of the steel 1 of between 0.15% and 0.3% makes it possible to obtain, on the one hand, a sufficiently high hardness of the steel 1 and, on the other hand, good weldability. It is difficult to combine these two properties since the carbon concentrations that favor these properties are incompatible.

According to a particular property, the element 2 of the invention, constructed with such a steel 1, is characterized in that the surface hardness is greater than 440 HB. This initial surface hardness has the advantage of being able to be further improved by work hardening, for example in service, in order to increase and reach a hardness greater than 540 HB. Such hardness thus makes it possible to slow down the rate of wear of the switch in use. The production of a frog with such a steel 1 also makes it possible to avoid the risks of deformation of the traffic surfaces, limiting or even eliminating on-site reprofiling interventions.

The metallurgical structure composed of tempered martensite, residual austenite and bainite, obtained thanks to the chemical composition in combination with a quenching heat treatment with controlled cooling and tempering, allows the creation of a wear-resistant frog, whose material surface is capable of work hardening in service.

According to a feature of construction, the element 2 according to the invention is characterized in that the quantity of nickel is less than 0.8%. Preferably, the quantity of nickel is of the order of 0.4%.

According to another feature of construction, the element 2 according to the invention is characterized in that the quantity of carbon is greater than 0.2%.

According to another feature of construction, the element 2 according to the invention is characterized in that the quantity of manganese is less than 1.5%.

According to another feature of construction, the element 2 according to the invention is characterized in that the quantity of chromium is less than 1.5%.

According to a construction feature, the element 2 according to the invention has a height of between 80 mm and 200 mm. The steel 1 used in the context of the element 2 of the invention makes it possible to produce a part whose thickness is of the order of 200 mm, without its properties of strength and hardness being impaired thereby. This property thus allows the construction of elements 2 with significant variability in terms of thickness, while retaining homogeneity of its hardness and its direct weldability.

The invention also relates to a method for assembling at least one element 2 according to the invention with a complementary part 4 by direct flash welding, comprising in particular:
- a first step carried out by a first flashing phase intended to increase the temperature of the surfaces to be welded in a homogeneous manner, the duration of this first step being between 15 s and 40 s,
- a second step carried out by a phase of preheating by Joule effect of the parts to be welded, the duration of this second step being between 45 s and 55 s with a heating current of between 55 kA and 70 kA,
- a third step carried out by a second flashing phase to deoxidize the faces to be welded while avoiding their re-oxidation, the duration of this third step being between 12 s and 22 s, with a flashing current of between 16 kA and 19 kA,
- a step of bringing the surfaces to be welded into contact.

According to a feature of implementing the method of the invention, the first flashing phase is preferably carried out for a duration of greater than 30 s. Such a duration makes it possible to guarantee uniformity and homogeneity of the temperature over the section of the element 2 of the invention to be welded.

According to another additional feature of implementing the method of the invention, the preheating phase is operated with a current of the order of 60 kA so that the characteristics of the steel 1 are not excessively affected. Thus, although during this preheating the hardness of the element 2 has variations in the heat-affected zone, it should be noted that, in this zone, the average hardness is of the order of 370 HB.

According to another feature of implementation, the assembly method according to the invention is characterized in that, at the end of the second flashing phase, the speed of advance is between 2 mm/s and 3 mm/s.

According to a specific aspect of this additional feature of implementing the method of the invention, the speed of advance of the second flashing phase remains sufficiently slow to avoid any short circuit, preferably being between 2 mm/s and 2.8 mm/s.

It should be understood that, in the context of on-site installation, the complementary part 4 generally consists of a portion of rail that is intended to be positioned in the extension of a switch.

The invention also relates to a direct weld 3 of an element 2 according to the invention, made entirely with a steel 1 of an above-mentioned composition, with at least one rail 4, obtained by an assembly method according to the invention. This direct weld 3, that is to say a weld without an insert, obtained by the method of the invention is characterized in that the breaking force F, expressed in kN, of the weld 3 in flexion according to EN14587-3 is greater than the product of the modulus of inertia $W_{base}$ at the level of the base, expressed in cm³, multiplied by 4.261, according to the formula:

$$F \geq 4.261 \times W_{base}$$

This flexural breaking force is measured in the context of a test carried out according to standard EN14587-3, set out in paragraph § 10.4.7 and in its appendix B, after welding of an element 2 of the invention to a rail 4.

According to one feature of this direct weld 3, the breaking force is greater than 1600 kN for a rail section 4 of profile 60E1 whose base modulus of inertia W is equal to 375.5 cm³. By way of comparison, the welding of a rail identical to a frog made of manganese steel with an austenitic structure as conventionally produced only guarantees a breaking force in flexion of the order of 850 kN for this same rail profile.

Furthermore, it should be noted that the strength obtained by a direct weld 3 of the invention between an element 2 according to the invention, made entirely with a steel of an above-mentioned composition, and a rail 4 corresponds to the strengths conventionally obtained in the context of a weld between two rails 4 of a current track.

According to an additional feature of this direct weld 3, the fatigue strength according to the "all or nothing" method without breaking is at least 5 million passage cycles with a stress of 21 to 210 MPa. This fatigue strength is measured in the context of a test carried out according to standard EN14587-3, detailed in paragraph § 10.4.8 and in its appendix D. For comparison, welding to a frog made of manganese steel with an austenitic structure as conventionally produced has a strength without breaking to 5 million passage cycles with a stress of only 14 to 144 MPa.

Of course, the invention is not limited to the embodiment described and shown in the appended drawings. Modifications remain possible, particularly from the point of view of the composition of the various elements or by substituting technical equivalents, without otherwise departing from the scope of protection of the invention.

The invention claimed is:

1. A method for assembling at least one rolling support and guide element with a complementary part by direct flash welding, said method comprising the steps of:

a first step carried out by a first flashing phase intended to increase the temperature of the surfaces to be welded in a homogeneous manner, the duration of this first step being between 15 s and 40 s, a second step carried out by a phase of preheating by Joule effect of the parts to be welded, the duration of this second step being between 45 s and 55 s with a heating current of between 55 kA and 70 kA, a third step carried out by a second flashing phase to deoxidize the faces to be welded while avoiding their re-oxidation, the duration of this third step being between 12 s and 22 s and with a flashing current of between 16 kA and 19 kA, a step of bringing the surfaces to be welded into contact.

2. The method as claimed in claim 1 wherein, at the end of the second flashing phase, a speed of advance is between 2 mm/s and 3 mm/s.

3. The method as claimed in claim 1, wherein said direct flash welding is conducted on a steel forming a rolling surface of said rolling support and guide element, the steel having a mixed structure of tempered martensite and residual austenite and bainite after undergoing heat treatment with quenching and at controlled rate and duration, the steel including, in addition to Fe, $0.15 \leq C \leq 0.3\%$, $1 \leq Mn \leq 2\%$, $0.2\% \leq Ni \leq 1\%$, $0.5 \leq Cr \leq 2\%$.

4. The method as claimed in claim 3, wherein said whole rolling support and guide element is made of the steel.

5. The method as claimed in claim 3, wherein the quantity of nickel in the composition of the steel is about 0.4 or less %.

6. The method as claimed in claim 3, wherein the method results in surface hardness greater than 440 HB.

7. The method as claimed in claim 6, further comprising the step of work hardening to increase the surface hardness to a value greater than 540 HB.

8. The method as claimed in claim 1, wherein the rolling support and guide element has a height of between 80 mm and 200 mm.

9. The method as claimed in claim 1, wherein said direct flash weld results in welded joint having a breaking force F, expressed in kN, of the welded joint in flexion according to EN14587-3 being greater than the product of the modulus of inertia $W_{base}$ at the level of the base, expressed in cm³, multiplied by 4.261, according to the formula:

$$F \geq 4.261 \times W_{base}.$$

10. The method as claimed in claim 9, wherein the breaking force of the welded joint is greater than 1600 kN for a rail section whose base modulus of inertia W is equal to 375.5 cm³.

11. The method as claimed in claim 9, wherein the fatigue strength of the welded joint according to the "all or nothing" method without breaking is at least 5 million passage cycles with a stress of 21 to 210 MPa.

* * * * *